(12) United States Patent
Barcikowski et al.

(10) Patent No.: US 9,403,160 B2
(45) Date of Patent: Aug. 2, 2016

(54) METHOD FOR PRODUCING MICRO-NANO COMBINED ACTIVE SYSTEMS

(75) Inventors: Stephan Barcikowski, Hannover (DE); Philipp Wagener, Hannover (DE); Andreas Schwenke, Hannover (DE)

(73) Assignee: Particular GmbH, Langenhagen (DE)

( * ) Notice: Subject to any disclaimer, the term of this patent is extended or adjusted under 35 U.S.C. 154(b) by 409 days.

(21) Appl. No.: 13/994,054

(22) PCT Filed: Dec. 16, 2011

(86) PCT No.: PCT/EP2011/073031
§ 371 (c)(1),
(2), (4) Date: Aug. 22, 2013

(87) PCT Pub. No.: WO2012/080458
PCT Pub. Date: Jun. 21, 2012

(65) Prior Publication Data
US 2013/0331257 A1    Dec. 12, 2013

(30) Foreign Application Priority Data

Dec. 17, 2010 (DE) .......................... 10 2010 063 342

(51) Int. Cl.
| | |
|---|---|
| *B01J 35/00* | (2006.01) |
| *C08K 3/00* | (2006.01) |
| *B82Y 30/00* | (2011.01) |

(52) U.S. Cl.
CPC ............. *B01J 35/0006* (2013.01); *B82Y 30/00* (2013.01); *C08K 3/0008* (2013.01); *C08K 3/0083* (2013.01); *C08K 3/0091* (2013.01)

(58) Field of Classification Search
CPC ... B01J 35/0006; B82Y 30/00; C08K 3/0008; C08K 3/0083; C08K 3/0091
See application file for complete search history.

(56) References Cited

U.S. PATENT DOCUMENTS

| | | | | |
|---|---|---|---|---|
| 4,588,574 A | * | 5/1986 | Felder | ................ A61K 49/0404 419/1 |
| 8,821,786 B1 | * | 9/2014 | Biberger | ................ C23C 4/127 419/19 |
| 2005/0285073 A1 | | 12/2005 | Singh et al. | |
| 2006/0159603 A1 | * | 7/2006 | Vanheusden | .......... B22F 1/0018 423/1 |

FOREIGN PATENT DOCUMENTS

| | | | |
|---|---|---|---|
| CA | 2380490 A1 | * | 8/2001 |
| DE | 103 31 324 | | 3/2004 |
| WO | WO 01/09229 | | 2/2001 |
| WO | WO 01/83155 | | 11/2001 |
| WO | WO 2010/007117 | | 1/2010 |

OTHER PUBLICATIONS

IUPAC Compendium of Chemical Terminology, 2014, entry for "colloidal".*
Panacek, A., et al.; Journal of Physical Chemistry Part B, 2006, p. 16248-16253.*
Amendola, Vincenzo, et. al., "Controlled size manipulation of free gold nanoparticles by laser irradiation and their facile bioconjugation", *J. Mater. Chem.*, 2007, 17, 4705-4710.
Petersen, Svea, et. al., "In situ bioconjugation—Novel laser based approach to pure nanoparticle-conjugates", *Applied Surface Science*, 255 (2009) 5435-5438.
Petersen, Svea, et. al., "In Situ Bioconjugation: Single Step Approach to Tailored Nanoparticle-Bioconjugates by Ultrashort Pulsed Laser Ablation", *Adv. Funt. Mater.*, 2009, 19, 1167-1172.
Slocik, Joseph M., et. al. "Synthesis of Gold Nanoparticles Using Multifunctional Peptides", *small*, 2005, No. 21, 1048-1052.

* cited by examiner

*Primary Examiner* — Robert Jones, Jr.
(74) *Attorney, Agent, or Firm* — Greer, Burns & Crain, Ltd.

(57) ABSTRACT

The invention relates to a method for producing micro-nano combined active systems in which nanoparticles of a first component are bonded to microparticles of a second component, comprising the following steps: (a) producing a low-ligand colloidal suspension containing nanoparticles of the first component, (b) adding microparticles to the colloidal suspension containing the nanoparticles or adding the colloidal suspension containing the nanoparticles to a dispersion containing the microparticles and intensively mixing so that the nanoparticles adsorb onto the microparticles, (c) separating the microparticles and the nanoparticles bonded thereto from the liquid and drying the microparticles and the nanoparticles bonded thereto.

15 Claims, No Drawings

METHOD FOR PRODUCING MICRO-NANO COMBINED ACTIVE SYSTEMS

GENERAL DESCRIPTION OF THE INVENTION

A process for the production of micro-nano combined active systems

DETAILED DESCRIPTION OF THE INVENTION

The invention relates to a method for producing micro-nano combined active systems in which nanoparticles of a first component are bonded to microparticles of a second component. Furthermore, the invention relates to the application of a micro-nano combined active system.

Nanoparticles, which contain active elements, are used for example in medical devices. The application of medical devices often leads to infections due to contamination with bacteria or viruses. The surfaces of medical devices can be protected from colonization by bacteria and therefore from formation of a biofilm in which bacteria can enclose, by the use of metallic nanoparticles of silver, copper or zinc. In moist environment, metallic nanoparticles release ions that cause death of bacteria after contact with cell walls, and therefore provide an antibacterial protection. If the nanoparticles are only applied as a coating on the surfaces of medical devices, they can be detached under mechanical stress and therefore lead to toxic reactions in the organism. In addition, such thin layers do not provide long-term protection against the formation of a biofilm. To enable medical devices made of polymer with an antibacterial long-term protection, a volume functionalization of the complete polymer matrix with embedded nanoparticles can be performed. Therefore, the nanoparticles are very finely embedded into the polymer matrix, in order to achieve an antibacterial protection even at low concentrations of particles due to the large effective particle surface. Other areas, in which nanoparticles are used, are for example catalysts and labeling substances for protection against counterfeit goods.

From EP-B 1 536 848, a method for producing an antimicrobial polymer material product is known. For this purpose, a polymer precursor is treated with an antimicrobial, colloidal metal, a soluble or poorly soluble salt of an antimicrobial metal is added and the polymer product is formed. The colloidal metal is produced by reduction of metal salt solutions. A corresponding method, wherein a colloidal metal is produced by reduction of metal salt solutions and the colloid is added to a polymer used for producing polymer products in the medical supply is known from EP-B 1 210 386.

Disadvantage of the preparation of colloids by reduction of metal salts is, that it cannot be excluded, that hazardous substances such as silver nitrate and organic stabilizers are contained in the colloid.

Furthermore, in the method described in EP-B 1 210 386 concerning treatment of barium sulfate with colloidal silver, it is disadvantageous that, after treatment of the barium sulfate with colloidal silver, water has to be completely removed by evaporation and drying at 70° C., which means a large expenditure of energy for drying.

A method and an apparatus for producing metal-organic compounds are described in WO-A 2010/007117. Here, nanoparticles are prepared using a laser ablation process. Therein, a carrier fluid is passed along a metal body and nanoparticles are ablated from the metal body by laser irradiation. The resulting particles are entrained by the flow of the carrier fluid. However, the nanoparticles are used only in organic liquids which have an affinity for a cellular component. These nanoparticles containing organic liquid cannot be used as additive in polymer materials.

The object of the present invention is to provide a process for the production of micro-nano combined active systems, that does not include the disadvantage of the prior art and in which in particular no toxicologically harmful substances are formed in the production of the nanoparticles, which would remain in a nanoparticles containing product.

The object is achieved by a method for the production of micro-nano combined active systems in which nanoparticles of a first component are bonded to microparticles of a second component, comprising following steps:

(A) Producing a low-ligand colloidal suspension containing nanoparticles of the first component (B) Adding microparticles to the colloidal suspension containing the nanoparticles or adding the colloidal suspension containing the nanoparticles to a dispersion containing the microparticles and intensively mixing so that the nanoparticles adsorb onto the microparticles, (C) Separating the microparticles and the nanoparticles bonded thereto from the liquid and drying the microparticles and the nanoparticles bonded thereto.

The use of low-ligand nanoparticles, which are usually electrostatically stabilized in the colloidal suspension, has the advantage that the adsorption of the nanoparticles onto the microparticles is not hindered by steric shielding.

Low-ligand in the present invention means that for stabilization of the colloidal suspension, additives acting as ligands and other additives are only added to the colloid in a maximum total quantity that does not exceed the thirtieth part of the mass of the nanoparticles in the colloidal suspension. Among low-ligand also ligand-free particles are understood, for which no additives acting as ligands and no other additives are added to stabilize the colloidal suspension, which are thus stabilized purely electrostatic.

The generation of colloidal suspension containing low-ligand nanoparticles is carried out in particular by laser ablation of a substrate, which contains the first component. Therefore the substrate, which contains the first component, is placed in a liquid so that the ablated substrate material immediately solidifies in the liquid forming the colloidal suspension with nanoparticles. The generation of nanoparticles by energy transfer of a laser beam leads initially to ligand-free nanoparticles, whose adsorption efficiency to the surface of microparticles is significantly improved as compared to nanoparticles which are prepared by other methods, for example chemically synthesized or surfactant-stabilized nanoparticles. Using ligand-free nanoparticles allows therefore the efficient generation of micro-nano combined active systems.

In one embodiment, specific ligands are used to stabilize the colloidal suspension up to a maximum concentration that is determined by the fact that the mass proportion of the additive acting as ligands is at most the thirtieth part of the mass of the nanoparticles. The use of ligands enables a stronger ion release from the nanoparticles and thus improved efficacy. When used as a catalyst selective application of ligands enables a specific catalysis.

In the context of the present invention, a system is called a micro-nano combined active system, when it contains nanoparticles, which are adsorbed onto microparticles. The nanoparticles are thereby distributed individually on the surface of the microparticles.

In the context of the present invention, particles are called nanoparticles, having an average particle size in the range of 1 to 100 nm, preferably in the range of 5 to 50 nm and particularly in the range of 5 to 20 nm.

In the context of the present invention, microparticles are particles, which have a particle size of 0.05 to 100 µm, preferably in the range of 0.1 to 5 µm and more preferably in the range of 0.3 to 1 µm.

The first component is preferably a metal, especially a metal of the groups 9, 10 and 11 of the periodic table of elements, an alkaline earth metal or zinc or a mixture or alloy of two or more of these metals. If the metal of the first component is an alkaline earth metal, then magnesium is particularly preferred. Particularly preferred metals from groups 9, 10 and 11 of the periodic table of the elements are silver, gold, platinum and copper.

As liquids, in which the substrate, containing the first component, is positioned during the energy absorption of the laser beam, water or organic solvents are suitable. Suitable organic solvents are, for example, acetone, ethanol or isopropanol. The use of a suitable organic solvent or water is also dependent on the material of the first component. If the first component is for example a metal of groups 9, 10 or 11 of the periodic table of the elements, in particular silver, platinum or gold, preferably water is used as liquid. When using water, it is particularly preferred to use sterile, distilled water. The use of sterile distilled water allows the production of products under aseptic conditions, as it is necessary for medical devices.

When for example, magnesium, zinc or copper is used as a material of the first component, it is advantageous to use an organic solvent as liquid, especially acetone, ethanol or isopropanol. Through the use of the organic solvent, the degree of oxidation of the nanoparticles can be influenced. A further possibility for influencing the degree of oxidation is the use of ligands, for example by adding small amounts of sodium citrate.

The laser that is used for generation of the nanoparticles is preferably an ultra-short pulsed, solid-state laser. The advantage of an ultra-short pulsed solid-state laser with pulse duration in the range of femtoseconds to nanoseconds is the possibility to produce nanoparticles in flammable solvents without forming of pyrolysis products thereby. The ultra-short pulsed solid-state laser is thus particularly suitable for the generation of nanoparticles in an organic solvent.

The pulse frequency of the ultra-short pulsed solid-state laser is in the range of 10-2,000,000 Hz, preferably in the range of 100-10,000 Hz, and in particular in the range of 2,000 to 5,000 Hz.

Suitable wavelengths for the solid-state laser are in the range of 100 nm to 10 µm, preferably in the range of 300 nm to 1100 nm and in particular at 1064 nm.

Any from the state of the art known solid-state laser is suitable, if it can be operated with ultra-short pulses. To achieve high productivity, it is further preferred if a laser is used having a high output power.

The substrate containing the first component, which is evaporated by the energy absorption of the laser beam, may have any suitable shape. Thus, the substrate containing the first component can have for example the form of a rod, a plate, a prism, or a wire. Furthermore, it is also possible that the first component is present in the form of microparticles.

The first component can be present either as a pure substance in the substrate; it then preferably has a purity of at least 99.9 wt-%. Alternatively, it is also possible to use as a first component an alloy, for example an alloy of silver and gold. The content of the individual metals in the alloy can be chosen arbitrarily. It is also preferred herein that the proportion of other substances, for example, other metals or other contaminants that may be contained in addition to the alloying metals, is less than 0.1 wt-%.

In addition to an alloy of silver and gold, of course also any other alloy containing the metals, from which nanoparticles are to be produced, can be used. Particularly when using the micro-nano combined active system according to the invention, it is preferred, that the metal of the first component is silver, gold, platinum or copper or an alloy of at least two of these metals, for example an alloy of silver and gold. Furthermore, the first component may also be a mixture of two or more metals.

For the generation of nanoparticles it is preferred, that the liquid flows and circulates around the substrate, while the first component is ablated from the substrate by absorption of energy of the laser beam. It is particularly preferred, if the nanoparticles are generated in a chamber, which is flowed through by the liquid and in which the substrate is positioned. By flowing of the liquid through the chamber, the nanoparticles produced by absorption of energy of the laser beam, are removed directly from the chamber with the liquid. The concentration of nanoparticles in the liquid may be adjusted, for example, by the flow rate of the liquid and the rate at which the substrate is ablated by the laser.

To evaporate the substrate, the laser is preferably guided to the substrate from the outside of the chamber through a transparent window for the laser beam. It is possible to design the window, transparent for the laser, acting as a lens, which focus or deflects the laser.

Particularly in a batch process, the maximum possible concentration of nanoparticles in the fluid is limited by the concentration-dependent tendency of the non-ligand-stabilized nanoparticles to agglomerate. Suitable concentrations, for which the nanoparticles do not agglomerate, are usually up to 0.1 mg/ml.

Suitable materials for the microparticles of the second component are in the liquid insoluble salts, ceramics, metals, natural or synthetic minerals, polymers or magnetic substances. Here, the material is selected, for example, based on the desired characteristics of the micro-nano combined active system. Particularly preferred materials for the second component are barium sulfate, calcium sulfate, strontium sulfate, titanium oxide, aluminum oxide, silicon oxide, zeolites, mica, talc, kaolin, calcium carbonate, calcium phosphate, hydroxyapatite, iron oxide, tantalum, latex, starch, cellulose and derivatives thereof. Particularly preferred as material of the second component are barium sulfate and calcium phosphate. The use of barium sulphate is preferred in particular, when using the micro-nano combined active system for medical devices, because barium sulfate is commonly used as X-ray contrast agent. If the medical device is, for example, a central venous catheter, the barium sulfate provides, for example, a possibility for examination of the position of the catheter within the vein.

Besides using the micro-nano combined active system in medical applications, different materials can be used then barium sulfate. For production of medical devices, material used for the second component can be different from barium sulfate, if a function as X-ray contrast agent based on the second component is not required.

According to the invention, the nanoparticles are adsorbed to the microparticles. Therefore, it is necessary to bring the microparticles into contact with the nanoparticles. In order to bring the microparticles into contact with the nanoparticles, it is possible for example to add the microparticles to the colloidal suspension of the nanoparticles. Alternatively, the colloidal suspension containing the nanoparticles can be admixed with the microparticles.

In particular, in the embodiment, in which the nanoparticles are produced in a chamber which is flowed through by the liquid, it is preferred to divert the liquid containing the nanoparticles out of the chamber into a container for mixing with the microparticles. Alternatively, it is also possible to add, for example, the microparticles in the chamber. In another embodiment, especially in a continuous generation process, it is also possible to add the microparticles in a pipe, which is flown through by the colloidal suspension. The amount of the microparticles, which are added to the suspension, is dependent on the concentration of the nanoparticles in the colloidal suspension and the desired concentration of nanoparticles on the microparticles.

Alternatively, it is also possible that the amount of nanoparticles is selected such that on the microparticles a layer, consisting of nanoparticles, is formed having pores between the individual nanoparticles. Such tight packing of nanoparticles on the microparticles is useful, if a large specific surface of the material of the nanoparticles is desired, for example for application of the nanoparticles as a catalyst.

In order to influence the properties of the micro-nano combined system, it is also possible to add additives to the blending of microparticles and nanoparticles. Here, it is preferable to carry out the addition of the additive after mixing of microparticles and nanoparticles, in order to avoid shielding of the surface of the nanoparticles by ligands which may negatively affect the adsorption of the nanoparticles on the microparticles.

In order to disperse the microparticles homogeneously in the liquid, it is advantageous, if the liquid, containing the microparticles and nanoparticles, is thoroughly mixed. This is possible, for example by stirring with a suitable stirrer. As a stirrer, every stirrer known to person skilled in art, can be used. In particular, mixing prevents the sedimentation of the microparticles during adsorption process in the liquid.

An improved adsorption of the nanoparticles on the microparticles can occur, when at least partially ultrasonic dispersion is applied to the liquid during the mixing in step (B). The ultrasound can be applied during the entire mixing process, or alternatively it is also possible to work with individual ultrasonic pulses. Also, it is possible to switch on ultrasound only temporarily during mixing.

In particular, for production of the micro-nano combined active system by a continuous process, it is advantageous, to take the liquid, which flows through the chamber and in which the nanoparticles are produced by energy absorption of a laser beam, from a container, followed by flowing through the chamber and then return it to the container. The microparticles are added into the container.

In order to avoid that the microparticles in the liquid adversely affect the production of the nanoparticles in the chamber, it is preferred to initially retain the microparticles through a suitable filter system, such as through an ultrafiltration, in the container.

After the production of the micro-nano combined active system, it is preferred to separate the microparticles together with the adsorbed nanoparticles from the liquid. For this purpose, for example, it is possible to first concentrate the particles, which can be carried out for example by using an ultrafiltration. Alternatively, it is also possible to separate the particles by sedimentation and decantation or centrifugation of the liquid.

Depending on the method, by which the particles are separated from the liquid, it may be necessary to carry out desagglomeration or grinding of the particle cake which is formed after removal of the liquid. Thus, for example by decantation, sedimentation or filtering a solid cake could be formed, which must be broken up. By desagglomeration or grinding the resulting cake is comminuted into the size of microparticles.

The micro-nano combined active system can be used, for example, as a functional additive for a polymer mixture for the production of polymer parts. Alternatively, it is also possible to use the micro-nano combined active system as a catalyst. Another possible application is the use as a marker substance for protection against plagiarism. Thus it is possible, for example, to incorporate the active system of the invention into a material for the production of products, in particular a polymer. As a micro-nano combined active system, for example, nanoparticles made of an alloy of 35% silver and 65% gold on barium sulfate is suitable. Based on the wavelength-dependent absorption of the nanoparticles made of the alloy, which can be detected by simple detection of light absorption, it can be determine, whether a product is an original or plagiarized. Alternatively, using an analytical method, by which the embedded system can be detected, the authenticity of a product can be proved. The used micro-nano combined active system can be incorporated at specific points of the product or evenly distributed throughout the product.

Upon addition of the micro-nano combined active system as a functional additive for polymers, it is particularly preferred, if the polymer mixture is used for the production of medical devices. In this case, the materials of the micro-nano combined active system are selected in a way, that the nano-micro combination has an antimicrobial property.

The microparticles can either act as a carrier of the active nanoparticles or having an effect by their own. Thus, for example, it is possible, that the microparticles act as X-ray contrast agent and the nanoparticles have, for example, an antimicrobial effect. Silver nanoparticles, for example, have an antimicrobial effect. In order to optimize the antimicrobial properties, it is possible, for example, to use silver as an alloy with a noble metal such as platinum, gold, ruthenium, rhodium or palladium. The use of alloys for the micro-nano combined active system is particularly advantageous for the use as a catalyst or as an additive for anti-counterfeiting.

If the microparticles are intended to serve as X-ray contrast agent, it can, as already described, be made for example of barium sulfate. Alternatively, it is also possible to use tantalum as a material for the microparticles.

In a first embodiment, if a mixture of different nanoparticles is to be used and the nanoparticles are each in a colloidal suspension, first the colloidal suspensions containing the nanoparticles are mixed. Then the addition of microparticles follows. Alternatively, it is also possible, for instance to use for the generation of nanoparticles two substrates, or a substrate containing an alloy or a mixture of different materials and thereby produce a colloidal suspension of nanoparticles, in which already nanoparticles are present, which respectively contain different materials, for example alloys, or are mixing by different materials.

In addition to use as an additive in polymer parts, micro-nano combined active systems can, for example, be used also as a catalyst. When used as a catalyst, the reaction determining step is generally the adsorption of the substrate on the free surface of the catalyst. In contrast to chemically generated nanoparticles, which are stabilized by surface functionalization, the active surface of ligand-free nanoparticles, which are generated using, for example, energy absorption of a laser, is greater, because no portion of the surface is shielded by a surface functionalization.

Particularly in active systems, which are used for the catalysis of reactions, the connection to microparticles is used in particular to facilitate removal from a reaction liquid. In this way the catalyst can be reused. An improved separation of the catalyst can also be achieved in the way that microparticles, made of a magnetic material, are used for example. In this case, the catalyst can be magnetically separated from the reaction liquid.

For the catalyst any material is suitable, that is known to a person skilled in the art for usage as catalyst for a reaction. Common catalysts include, for example, platinum, gold, ruthenium, rhodium or palladium.

When using the micro-nano combined active system as an additive to a polymer mixture, it is a further advantage that due to the microparticles, on which the nanoparticles are adsorbed, a homogeneous distribution in the polymer matrix can be reached. In particular, thereby it is avoided, that the nanoparticles agglomerate.

The invention claimed is:

1. Method for producing a micro-nano combined active system in which nanoparticles of a first component are bonded to microparticles of a second component, comprising:
    producing a low-ligand colloidal suspension containing nanoparticles of the first component by ablating a substrate containing the first component with a laser beam while the substrate is positioned in a liquid such that first component of the substrate vaporized by the laser beam immediately solidifies in the liquid to form the nanoparticles in the colloidal suspension;
    adding microparticles to the colloidal suspension containing the nanoparticles or adding the colloidal suspension containing the nanoparticles to a dispersion containing the microparticles and homogeneously dispersing the microparticles so that the nanoparticles adsorb onto the microparticles; and
    separating the microparticles and the nanoparticles bonded thereto from the liquid and drying the microparticles and the nanoparticles bonded thereto to form the micro-nano combined active system.

2. Method according to claim 1, wherein the laser beam is produced by an ultrashort-pulsed solid-state laser.

3. Method according to claim 1, wherein the substrate, containing the first component, is a rod, a plate, a prism or a wire or is in the form of microparticles.

4. Method according to claim 1, wherein the first component is a metal of groups 9, 10 and 11 of the periodic table of elements, an alkaline earth metal or zinc or a mixture or alloy of two or more of these metals.

5. Method according claim 1, wherein the low-ligand nanoparticles are ligand-free.

6. Method according to claim 1, wherein the second component is a salt, insoluble in the liquid, a ceramic, a metal, a natural or synthetic mineral, a polymer material or a magnetic substance.

7. Method according to claim 1, wherein the second component is selected from the group consisting of barium sulfate ($BaSO_4$), calcium sulfate, strontium sulfate, titanium oxide, aluminum oxide, silicon oxide, zeolites, mica, talc, kaolin, calcium carbonate, calcium phosphate, hydroxyapatite, iron oxide, tantalum, latex, starch, cellulose or derivatives thereof.

8. Method according to claim 1, wherein the liquid flows against or around the substrate, while the first component is ablated by energy absorption of the laser beam.

9. Method according to claim 1, wherein the laser beam is guided from the outside through a window, transparent for the laser, to the substrate.

10. Method according to claim 9, wherein the window, transparent for the laser beam, is designed as a lens, which can focus or deflect the laser beam.

11. Method according to claim 1, wherein the liquid is water or an organic solvent.

12. Method according to claim 1, wherein the microparticles together with the adsorbed nanoparticles are separated from the liquid by ultrafiltration.

13. Method according to claim 1, wherein ultrasound is applied to the liquid during the dispersing.

14. Method according to claim 1, wherein during said separating the microparticles together with the adsorbed nanoparticles are separated from the liquid by sedimentation and decanting.

15. A method for the production of polymer parts or catalysts comprising conducting the method according to claim 1, and further comprising adding the micro-nano combined active system formed by said producing, adding, and separating as a functional additive to a polymer mixture for the production of polymer parts or as a catalyst.

* * * * *